United States Patent Office 3,533,725
Patented Oct. 13, 1970

3,533,725
WOOD FIBERS WITH POLYMER DEPOSITED THEREIN
Douglas J. Bridgeford, Danville, Ill., assignor to Tee-Pak, Inc., a corporation of Illinois
No Drawing. Continuation-in-part of abandoned applications Ser. No. 445,451, July 23, 1954; Ser. No. 594,124, June 27, 1956; Ser. No. 718,996, Mar. 4, 1958; and Ser. No. 506,123, Nov. 2, 1965. This application June 26, 1969, Ser. No. 836,974
The portion of the term of the patent subsequent to Mar. 26, 1980, has been disclaimed
Int. Cl. D06m 15/16, 15/30, 15/36
U.S. Cl. 8—115.6                                 9 Claims

ABSTRACT OF THE DISCLOSURE

Wood, wood fibers, cellulose fibers derived from wood, and other components of wood having ion exchange capacity in which polymer is deposited and grafted by in situ polymerization.

Cross-reference to related applications

This application is a continuation-in-part of applications Ser. No. 445,451, filed July 23, 1954; Ser. No. 594,124, filed June 27, 1956; Ser. No. 718,996, filed Mar. 4, 1958; and Ser. No. 506,123, filed Nov. 2, 1965, all now abandoned.

Summary of the invention

At least a portion of a polymerization catalyst system is controllably placed in a predetermined region within and/or upon woody fibers primarily if not solely through ion exchange bonding, and, with any remaining component of the catalyst system being supplied, deposition and grafting of a polymer of an olefinic monomer is carried out by in situ polymerization throughout the predetermined region in which the catalyst is present.

Starting materials with which method of invention may be used

Wood commonly contains cellulose, lignins, hemicelluloses, xylans, mannans, and resins. Any of these or other components of wood that have ion exchange capacity can be used herein. The form of wood material treated may vary and include, for example, pieces, powders, fibers, etc. Wood fibers used in the present invention may be in the form of non-chemically mechanical pulps or chemically treated pulps, including sulfate pulp, sulfite pulp, soda pulp, groundwood, peroxide pulp, sodium chlorite pulp, chlorine dioxide pulp, and pulp comprised of cellulose fibers from which substantially all the lignin has been removed.

Whatever type fibers are employed as the starting material, the fibers may be either in slurry or web form. The method of this invention is also useful with webs or sheets formed of fibers derived from wood between which hydration bonds exist, such as, for example, various types of paper and paper products.

In other words, the method of the present invention may be used to treat any polymeric material derived from wood, including wood itself and any component of wood, so long as the material possesses ion exchange capacity.

Use of solid wood as the starting material may, of course, present special problems of processing. As is well known, the difficulty of uniform impregnation of a wood chip or other wooden article varies with various wood species and with whether the wood is summer wood or spring wood. Thus, well known techniques of achieving uniform impregnation of any such materials may be employed with the various steps of the method of this invention when necessary.

Changes in characteristics of materials treated with this method

Depending upon the type of starting material, the monomer used for polymerization, the temperature and time period for the process, the polymerization catalyst used, and other things, the polymer-modified wood fibers or other material resulting from use of this method display many chemical and physical characteristics which are different from those of the corresponding untreated material.

Generally speaking, the treated fibers or other material display markedly reduced solubility in ordinary cellulose solvents, increased rot resistance, increased acid resistance and a reduced rate of moisture regain. In contrast to the last mentioned result, it is interesting to note that deposition of certain polymers produces an opposite result, making the treated fibers or other material more hydrophilic instead of more hydrophobic.

Under some conditions, the method of this invention makes the treated material flame retardant. Variations in the hand and extensibility of sheets formed of fibers treated by the method of this invention may also be observed.

Some of the treated wood fibers resulting from use of this invention are thermally moldable. Such fibers may, if desired, be ground or otherwise reduced in particle size to produce a molding powder.

Many of the polymer-modified wood pulps resulting from the method of this invention will be suitable for use as improved reinforcing agents in plastics, tile, nonwoven textiles, wall boards, specialty papers, etc. The slower moisture regain of many of the treated fibers makes them less sensitive to transient changes in relative humidity than unmodified wood fiber. In many cases the resistance to flame, acid attack, and microbiological attack or rot will suggest other applications in batts, insulation, shock absorbers, etc.

Catalyst placement in "deposition region" through ion exchange bonding

In the method of this invention, the polymeric material derived from wood which is to be treated such as wood fibers preferably in the form of an aqueous slurry, are contacted with a catalyst, or part of a catalyst system, for effecting polymerization of the monomer or monomers to be deposited within the material, which catalyst or part of a system is also capable of ion exchange with chemical groups of the material to be treated. The ion exchange involved will ordinarily be cation exchange with the hydrogen or cation associated with the carboxyl groups of the cellulose in, for example, wood fibers.

This step is carried out with the catalyst concentration, pH, and other reaction conditions such as to produce ion exchange between the catalyst and the polymeric starting material. As a result, the catalyst is held by ion exchange bonding with chemical groups of the wood or other material derived from wood within a region in the interior and/or upon the exterior of the material that may be called a "deposition region."

The term "deposition region" is used to describe the region in which the polymerization catalyst is bonded in the manner just described to the material being treated, because in the remaining steps of the method of this invention a polymer is formed and deposited in the same region. In this specification and claims, the material being treated by the method of the invention is sometimes referred to as the "polymeric starting material," "polymeric host material," or "host polymer," while the polymer which is added to the starting material is sometimes referred to as the "guest polymer."

The conditions of pH, cation or anion source concentration, and the like, at which ion exchange will proceed between ion exchange groups in the polymeric starting material and ions in the polymerization catalyst vary greatly with the particular starting or host material and the particular ion source employed. The general conditions for producing ion exchange are well known in the art; the particular conditions required for particular reagents can be developed from available knowledge by any person skilled in the art. Among other things, one determining the necessary conditions for ion exchange in a particular situation may consult the principles set forth at page 25 of Ion Exchange Resins, Kunin and Meyers, Wiley, New York, 1951.

Determination of boundaries of deposition region

The "deposition region" in a given polymeric starting material may be, for example, the entire interior of the individual articles—such as individual fibers, sheets, chips, granules, particles, or the like—being treated with the method of this invention. However, if desired, it may be restricted to only that portion of the article, including the surface thereof and extending inwardly from the surface substantially a uniform distance, which in effect forms a sheath about the article. Or, if it is preferred, the deposition region may be localized at the core of each of the articles being treated, such as, for example, individual fibers.

There are at least two methods by which the polymerization catalyst may be bonded to the ion exchange groupings of the material being treated in a sheath-like deposition region restricted to the outer portions of the article. First, ion exchange groups may be introduced to only the outer portions of the interior of the article. The topochemical reaction between fibrous cellulose and sodium chloracetate is an example. Second, if ion exchange groups are initially present throughout the interior of the material to be treated, ultimate bonding of the catalyst to the starting material may be liimted to only the outer portion of the interior. An example of this method would be to contact cellulose derived from wood (which contains carboxyl groups) with a solution of almost neutral ferrous iron for a very short time so that only the carboxyl groups in the outer portions of the interior of the cellulose are converted by ion exchange to the iron salt.

In order to restrict the deposition region to the center or core only of the article being treated, the article may be treated so as to exchange all the ion exchange groups in the interior of the article, with the thus treated article thereafter being passed through an oxidizing or reducing agent for a period of time that is sufficiently short that only the catalyst in the outer portions of the article is destroyed. In this way, catalyst placement is restricted to a deposition region that occupies only the center of the article being treated, and polymer formation and deposition will be similarly restricted in the other steps of the method of the invention.

Distribution of catalyst within deposition region

No matter whether the deposition region formed by controlled placement of the polymerization catalyst extends throughout the entire interior of the article being treated, or constitutes only a sheath around the article, or constitutes only a central core, the distribution of the catalyst throughout the region involved corresponds substantially to the distribution within the deposition region of the ion exchange groupings by means of which the catalyst is bound to the polymeric starting material.

Now, in any given case a particular catalyst will be bound to the chemical groups of the polymeric starting or host material by exchange of ions having a particular sign, i.e., either plus or minus. Hence the distribution of catalyst within the deposition region will be substantially similar to the distribution within the region of ion exchange groupings of a given sign contained in the host.

Distribution of polymer within deposition region

When a suitable olefinic monomer is contacted with the polymeric host material containing polymerization catalyst distributed within the deposition region as just described, and the other necessary conditions for polymerization are present, a guest polymer will be formed and deposited in the vicinity of the ion exchange groupings of the host to which the catalyst is bound.

The reason for this is that the decomposition of the catalyst or the reaction of the catalyst produces very reactive species in the near neighborhood of the bound ionic species. These reactive species may be excited states of ions or molecules, or free radicals. Whatever they are, they are usually so reactive that they cannot diffuse an appreciable distance (relative to molecular dimensions) before they react further in any of a number of ways, some of which are:

(a) Reaction with atoms or atom groupings of the host material.

(b) Reaction with the solvent in the host.

(c) Reaction with substances dissolved in the imbibed liquid in the host.

(d) Reaction with other active species.

(e) Unimolecular transformation to more stable species.

(f) Reaction with a monomer molecule to convert it to a free radical or other species that can propagate the growth of a polymer by monomer molecule addition.

In most common olefinic polymerization processes the growth of the polymer molecule is complete in a small fraction of a second or the growing polymer is so large that its diffusion rate is very slow. Thus the polymer is necessarily placed in the near locus of the bound catalyst. In addition, physical entanglement of the guest molecule among the host molecules as well as intermolecular attraction further retards or prevents change in position of the guest molecule.

It follows from this that the concentration of the deposited polymer in the materials resulting from use of this invention is greatest in the vicinity of the ion exchange groups to which the polymerization catalyst is bound in the catalyst placement step of the invention. Likewise, the distribution of the deposited polymer within the deposition region is substantially the same as the distribution within the region of ion exchange groupings of a given sign contained in the host.

In many instances the ion exchange groups of the host polymer are distributed uniformly throughout any deposition region in which they are found. In these instances the ultimate polymer deposition will extend uniformly throughout the deposition region within the polymeric article that has been treated. Staining with various reagents, such as iodine, that will selectively stain the deposited polymer with a dark color and the unmodified polymeric starting material with a light color if at all, gives experimental evidence that in any such instance the deposited polymer in the final material resulting from use of this invention is distributed uniformly throughout the deposition region.

Graft copolymerization

Because of the intimate molecular mixture of the polymeric host material and the monomer introduced into the deposition region, the deposited polymer and the host polymer form an intimate mixture. In addition, the physical properties of the resulting polymer-modified material are consistent with at least a partial graft copolymerization of the host and guest polymers.

Since a radical or other active species is created very near the host molecule, this species can attack many types of host polymeric materials and produce a radical or other active site on the polymeric host molecule itself. This active site may react with monomer molecule and initiate a polymerization so that a graft copolymer of the host and guest is produced.

Alternatively, the growing polymer species may attack the host material and become attached to it or remove an atom to create an active site so that a polymer branch is initiated on the host material molecules.

As an example of the essentially permanent fixation of location of the deposited guest polymer, polymer-cellulose films four years old showed no migration of the polymer when the polymer deposition had been restricted to the outer layers of one side of the film. The guest polymer could not be extracted with several good solvents for the bulk polymer. These data are consistent with chemical interaction between host and guest polymers although not all deposited polymer need be reacted.

Coordinate valence bonding

In addition to the bonding of catalyst to the polymeric starting material through salt linkages produced by ion exchange, the catalyst is in some cases bound at least in part through so-called "coordinate valence bonding." Such bonding utilizes at least some of the coordinative capacity of the host material and of the metal ion, for example, which is a part of the catalyst system. The bond so formed is between structural groups in the host material such as carboxyl, amino, nitro, etc., and electrons in the inner sheet of the associative ion such as the metal ion just mentioned. Bonds of this type may be present in addition to ion exchange linkages, in which case both bonds assist in anchoring the polymerization catalyst in place within the deposition region in the interior and/or upon the external surfaces of the material being treated.

The cobaltous ion provides an example of a catalyst ion that may be bound in part to the polymeric host material through coordinate valence bonding. The cobaltous ion in aqueous solution is usually written $Co^{++}$ but it is actually an aquo ion in water, i.e., the cobaltous ion has several molecules of water bound to it within its coordination sphere. When this ion (which can serve as part of a polymerization initiating catalyst in the method of this invention) diffuses into a wet cellulose film it can bring its associated water molecules with it. When the cobaltous ion solution is of such concentration and has been adjusted to such pH that the cobaltous ion can "exchange" with the cation already associated with the negative groupings (mainly carboxyl or carboxylate) of the cellulose, the cobaltous cation is in such close spatial relation to the cellulose that hydroxyl groups on the same or adjacent cellulose molecules may take part in the coordination sphere of the cobaltous cation or displace water molecules already associated therewith.

It is clear that in a host article of more complex chemical structure such as a protein the possibility for coordinative participation in the linkage of the bound catalyst cation or anion is even more obvious.

The mechanism of coordinate valence bonding does not neutralize the attached ion, which is left electrolytically charged. However, the ion attached to the host material through this type of bonding can be neutralized by association of still other ions. Thus, for example, a nickel ion might associate itself through coordinate valence bonding with the carbonyl groups in a host material that has relatively few such groups. Such a nickel ion might then of its own right provide part of a polymerization catalyst system. Or the nickel ion might be neutralized by association with a sulfite or persulfate ion, thereby changing the category of catalytic behavior of the total catalyst system (cation plus anion) anchored in the polymeric host material.

Polymerization catalysts

The polymerization catalyst employed in the method of this invention may be a single compound which by itself is capable both of ion exchange bonding with the material being treated and of initiating polymerization of the monomer or monomers to be deposited in the fibers. Or it may be a multiple component catalyst system, such as a so-called "redox couple," one part of which is incapable by itself of initiating polymerization. In such case one component of the catalyst system may if desired be introduced into the starting material separately through an ion exchange reaction which binds it to the individual articles being treated, with the remainder of the system being introduced into the material thereafter to complete the catalyst.

The remaining steps of the method of this invention are to contact the material being treated with a monomer or monomers, preferably in solution, and to continue such contact to form and deposit a polymer or copolymer of the monomer throughout the deposition region defined by the controlled catalyst placement step of the method.

In the case of a multiple component catalyst system, the preferred order of steps is to (1) introduce the first component of the catalyst into the polymeric starting material by ion exchange, (2) then contact the material with the monomer, and (3) thereafter contact the material with the remaining component or components of the catalyst system.

However, if desired, the order of these steps may be varied. For example, the starting material may be first contacted with the monomer and then successively with the two components of the catalyst system. The two components of the catalyst may be applied in succession, followed within a short time by the monomer. If desired, the monomer and one component of the catalyst system may be applied simultaneously, followed by the remainder of the catalyst system. Alternatively, either of the components of the catalyst system may be applied first, followed by simultaneous application of the monomer and the remainder of the catalyst system. If the polymerization catalyst system is a so-called "redox couple," the reducing and oxidizing agents may be applied, in the steps just listed, with either one of the two agents introduced first.

The catalysts that may be used with the method of this invention include ferrous ammonium sulfate plus hydrogen peroxide, guanidine hydrochloride plus ammonium persulfate, ethanolamine plus ammonium persulfate, uranyl, silver ion plus persulfate, dimethyl aniline plus benzoyl peroxide, and many others.

The speed of polymer formation with the bound catalyst has been found to be higher in some cases, and lower in others, than would be the case with a homogeneous polymerization using the same catalyst species and the same catalyst concentration. Thus the bound catalyst, in place within and/or upon the host polymer, is acting as a new catalyst system.

In these cases, the bound catalyst in place within the host polymer is acting in effect as a heterogeneous catalyst. The limitation in space available for polymer growth or the configuration of the force field around the growing guest molecule may impose limitations on direction and nature of polymer growth and even the steric (L or D) configuration of the guest. Depending upon the circumstances, this fact may either increase or decrease the rate of formation and deposition of polymer.

Monomers that may be used with method of this invention

The classes of monomers that may be used with the method of this invention include olefinic monomers such as vinyl, vinylidene, allyl and diene monomers. Some of the specific monomers that may be employed with the method of this invention include, for example, methyl methacrylate, methyl acrylate, ethyl acrylate, butyl acrylate, vinyl acetate, vinylidene chloride, styrene, acrylonitrile, 4-vinyl pyridine, acrylamide, vinyl pyrrolidone, acrylic acid, methacrylic acid, itaconic acid, allyl methacrylate, allyl acrylate, vinyl methacrylate, p-chlorostyrene, bis-B-chloroethyl vinyl phosphonate, 4-vinylcyclohexane, vinyl methacrylate, calcium acrylate, crotonic acid, B-aminoethylacrylate, disodium fumarate, methacrylamide, 2-N-morpholinoethyl acrylate, acrolein, and styrene sulfonic acid.

Mixtures of such monomers may also be employed, in many such cases resulting in formation and deposition of copolymers. If desired, the polymeric starting material may be treated first with one of these monomers and then with another.

Various reaction conditions

While water is the cheapest solvent or dispersion medium for the ion exchange and the polymer deposition steps of this method, other solvents and mixtures of solvents such as alcohols, dioxan, acetone and the like may be used. As a matter of fact, if desired the solvent may be omitted altogether and the polymerization reaction carried out by use of pure monomer.

The deposition may be carried out under air, nitrogen, an inert gas, a volatile monomer itself, or under steam from the refluxing solution as the blanket. The deposition may be carried out at room temperature or elevated temperature, and at atmosphereic pressure or above.

The various reagents employed in the method of this invention, such as the polymerization catalyst or the monomer to be polymerized, may be introduced into the host or starting material by spraying, printing, doctoring or other methods in addition to steeping.

The rate of the polymerization reaction in the method of this invention may be increased by use of any of various catalyst promoters, such as cupric ion, dextrose, etc., which are well known in the art.

The method of this invention may be carried out even in the presence of a quantity of polymerization inhibitor, if the inhibitor is a part of the catalyst system employed or it is neutralized by excess catalyst present. An inhibitor may be naturally present, for example, in the material derived from wood which is used as the polymeric starting material. The inhibitor may be a resin or dye, particularly of a quinone type. In some instances it may be necessary to remove the inhibitor before employing the method of this invention.

Various combinations of polymeric starting materials

The method of this invention may be applied to a blend of wood fibers and other cellulosic fibers such as, for example, sisal, cotton, bagasse, hemp, bamboo, straw, etc. Or, if desired, one or more of these various types of fibers may be first treated by the method of the invention and then combined with other treated or untreated fibers of any type whether wood fibers or not, before being formed into the final article for which the final mixture of fibers is intended.

The method of this invention may also be used to modify wood fibers or other starting material by the deposition of a given polymer in one treatment, followed by deposition of a second polymer thereafter.

The wood pulp may if desired be impregnated with a material such as benzoic acid, which is capable of binding ions and this material used to assist in binding the catalyst within the wood fiber.

Steric considerations

It is clear that in the method of this invention the host material must be permeable to both the catalyst ion that is to be bound with it and to the monomer molecule that is to be polymerized in the vicinity of the bound catalyst. Alternatively, the colloidal surfaces upon which the ion-binding groups are located must be accessible to the ion exchange. One may adjust the catalyst used so that its ion size is small enough, or one may swell the host material to permit entrance of catalyst and monomer, all in accordance with principles well known to persons skilled in the art.

With regenerated cellulose film with a swelling value of 2.1, for example, the entrance of vinyl stearate into the cellulose film substance is very slow, with resulting hindrance to polymerization. A more dilute system than wet regenerated cellulose, however, has larger interstices between the molecules and thus permits vinyl stearate to diffuse into the bound catalyst site where it may be polymerized.

It is clear also that the bound catalyst of this invention can be considered in some instances as a new heterogeneous catalyst system and the host monomer molecular may have to adopt a limited range of orientations at the bound catalyst locus to form the "activation complex" or other intermediate species with the catalyst. This adoption of an orientation requires space that may not be available with particular combinations of host material and catalyst.

In the case of native cellulose, the deposition of polyacrylonitrile into the fiber appears to be restricted to the "amorphous regions" as defined by X-ray diffraction studies of the polymer-modified cotton fiber. This may mean that acrylonitrile monomer cannot diffuse into the crystal lattice with appreciable speed, that catalyst cation could not diffuse into the crystalline regions, that no ion binding groups are present in the crystalline regions, or that the monomer cannot orient properly in a restricted space lattice.

The following examples will more particularly show the detailed practice of this invention, but are not to be considered as limiting.

Example 1

The food fiber starting material in this example was a pre-hydrolyzed sulfate chemical dissolving pulp of high alpha cellulose content. It was used as sheets of known moisture content cut into small pieces.

2.96 grams of dry cellulose wood fibers were steeped with gentle stirring for one hour in 250 parts of a one percent aqueous solution of ferrous ammonium sulfate containing 0.01 percent sodium lauryl sulfate wetting agent. The steeping was performed at 25° C. and at pH 5.3. The ferrous iron not combined with the ion exchange groups of the wood pulp fibers was washed out by two 20-minute washes with 200 parts of distilled water.

The wet wood pulp was placed in 300 parts of deaerated distilled water and 15 parts of inhibitor-free methyl methacrylate monomer was added and shaken with the water. Air was displaced by nitrogen from above the monomer solution and enough hydrogen peroxide was added to the monomer solution to make its concentration in the solution 0.025% by weight. The pulp was left in the monomer solution at 25° C. for 18 hours with occasional shaking. At the end of this time, a slight turbidity was observed in the aqueous solution. The pulp was removed from the slurry by filtration, washed with methanol and water and dried to constant weight under vacuum at 95° C.

Microscopic examination disclosed very little latex coating of the fibers. They now weighed 5.69 grams and contained about 48 percent interior deposited poly methyl methacrylate. The dried pulp sheets were somewhat hydrophobic, with a water drop remaining on the surface of the sheet for over 180 minutes. The dried pulp sheets were a very light tan color from the bound iron catalyst residue. The polymer-modified wood pulp was not soluble in cellulose solvents like cuprammonium hydroxide, cupriethylene diamine, or the new ferric tartrate complex solution of G. Jayme and W. Bergmann, Das Papier 11, 280–7 (1957).

The moisture regain of the poly methyl methacrylate-modified wood pulp was about the same as that of the initial wood pulp expressed on the basis of the cellulose content at 65% relative humidity and 70° F.

The rate at which moisture was taken up by the oven-dry modified wood pulp, whether or not in the presence of a wetting agent, was lower than that of unmodified wood pulp.

Example 2

The method of Example 1 was followed in this example, except that 15 grams of acrylonitrile monomer was used.

2.95 grams of dry wood pulp gave 4.40 grams of polyacrylonitrile-modified wood pulp. In this case, no turbidity at all was noted in the monomer solution after interior deposition into the wood fiber.

Microscopic examination showed no evidence of appreciable polymer coating of the wood fibers. The resulting sheets were not so hydrophobic as were sheets of poly methyl methacrylate-cellulose pulp, and a water drop remained five seconds. The polymer-modified wood pulp was insoluble and only slightly swollen in the cellulose solvents. It was furthermore highly resistant to microbiological attack in soil burial tests compared to the initial wood pulp.

Example 3

The method of Example 1 was followed in this example, except that 15 grams of acrylamide monomer was used.

In this case, also no turbidity was noted when the aqueous monomer solution was poured into 50 parts of methanol after the polymer deposition was finished. When 4.00 parts of cellulose pulp were used, 5.53 parts of polyacrylamide-modified wood pulp was obtained.

The pulp removed from the monomer solution was washed in hot water for several hours to remove any polymer coating. It was then washed in methanol and dried. The resulting polymer-modified wood pulp was not hydrophobic. It was only slightly swollen in cellulose solvents and showed excellent rot resistance in a soil burial test.

Example 4

The method of Example 1 was followed in this example, except that 4-vinyl pyridine was used as the monomer.

About 5 percent polymer was interior-deposited. When the polymer-modified cellulose pulp was placed in the iron-tartrate cellulose solvent it swelled to six times the original volume but did not dissolve in two days at 5° C. The pulp containing the basic polymer could be dyed with acid dyes and could take part in anion exchange processes in its chloride salt form with thiosulfate, sulfate, hydroxyl, and ferricyanide ions and the like.

Example 5

The method of Example 1 was followed in this example, except that a mixture of 7.5 grams of methyl methacrylate and 7.5 grams of acrylonitrile was used.

When 1.88 grams of cellulose pulp were used, 3.57 grams of copolymer-modified wood pulp was obtained. On the basis of nitrogen analyses, the deposited copolymer contained about 10% acrylonitrile and 90% methyl methacrylate monomer units in the chain. The polymer-modified pulp was insoluble in cellulose solvents and was more resistant to microbiological attack in soil burial than was a quantity of untreated control pulp. The pulp sheet was somewhat hydrophilic in that a drop of water wet it in 30 seconds.

Example 6

The method of Example 1 was followed in this example, except that 15 grams of ethyl acrylate was used and deionized tap water was used instead of distilled water.

When 3.27 grams of cellulose pulp fibers were used, 3.73 grams of interior deposited cellulose-polymer material was obtained. This material was hydrophobic in that a water drop required an hour to wet into a piece of the pulp sheet. The polymer-modified pulp was swollen slightly but was not dissolved in two days by cellulose solvents. It was noted that the slightly tan-colored pulp exhibited a plasticizer action when oven-dry, as compared with the unmodified pulp.

Example 7

The method of Example 1 was followed in this example, except that styrene was used as the monomer.

When 8.31 parts of cellulose was used, 8.71 parts of polystyrene-modified cellulose was obtained. Even with the 4.6% polystyrene deposited, the pulp sheets were hydrophobic and a drop of water required several hours to sink into the pulp sheet. The wood fibers were swollen but were not dissolved by the iron-tartrate complex.

Example 8

3.22 parts of wood pulp of the type used in Example 1 was steeped in 1.0% aqueous ferrous chloride for one hour to ion exchange the ferrous iron with the carboxyl of the wood fiber. The pulp was washed in distilled water and added to 300 parts of deaerated distilled water containing 10.0 parts of vinylidine chloride monomer. Enough hydrogen peroxide solution was added to make its concentration in the aqueous phase 0.03%, the system was blanketed with pre-purified nitrogen and was left at 25° C. for 18 hours.

No polymer latex was observed in the aqueous phase. The polymer-modified pulp was washed with methanol and dried to give 4.96 grams of product.

The initial pulp was white but it became browned when heated several hours at 130° C. The polymer-modified pulp was not soluble in iron-tartrate cellulose solvent and was only slightly swollen. It was noted that it displayed considerable flame retardency. When the polymer-modified sheet was held one inch over a Bunsen flame and ignited, the flame was extinguished immediately when the sheet was withdrawn from the Bunsen flame and little glow remained. A sheet of the untreated pulp starting material similarly ignited continued to burn after withdrawal from the flame.

Example 9

Numerous other free radical type vinyl polymerization initiating catalysts bound to the wood pulp substance may be used.

3.3 parts of wood pulp were steeped in 200 parts of 0.5 Normal nitric acid containing 0.1% ammonium hexanitrato cerate for 30 minutes and then washed with distilled water.

The ceric-treated pulp was placed in 300 parts of deaerated distilled water containing 10.0 parts of vinylidine chloride monomer and enough hydrogen peroxide was added to make its concentration in the solution 0.03% by weight. The mixture was left at 25° C. under nitrogen for 16 hours, washed in methanol and dried. About 3 percent polyvinylidine chloride had been deposited into the wood fibers.

Example 10

The hydrazine hydrate-ammonium persulfate redox couple was used for interior deposition of polyvinylidine chloride into wood fibers.

The method of Example 1 was followed in this example, except that the pulp was steeped in 0.1% hydrazine hydrate solution and after addition of the pulp to the monomer solution enough ammonium persulfate was added to make its concentration in the aqueous monomer solution about 0.1%.

2.55 grams of cellulose pulp gave 4.108 grams of polyvinylidine chloride-modified wood pulp. Very little polymer formed in the aqueous solution, although about 0.1 gram of polymer had formed by bulk polymerization in the monomer layer on the flask bottom.

It should be noted that although in the initial step in which the starting material is steeped in the catalyst the pH is adjusted to obtain appreciable ion exchange, the pH during the polymer deposition step need not be the same as during the deposition step; it may be adjusted either higher or lower, as desired, during deposition. In this example, the hydrazine hydrate solution had an alkaline pH while the ammonium persulfate used during deposition had a slightly acid pH.

In some cases, especially when metals are bound to the wood pulp as catalyst, it may be desired to secure part of the polymer deposition in the interior of the individual fibers and then to lower the pH to permit some of the cation to escape the cellulose and initiate polymerization in the space surrounding each cellulose fiber.

Example 11

A shorter time for polyvinylidine chloride deposition was secured by conducting the polymer deposition under pressure at 50° C.

For this purpose the pulp was steeped in 0.1% ferrous chloride solution to bind the catalyst by ion exchange, washed and placed in 100 parts of deaerated water contained in a magnesia bottle. After 1.0 ml. of 3.0% hydrogen peroxide and 1.0 ml. of vinylidine chloride monomer was added, the flask was capped and held at 50° C. for three hours. The pulp was washed with methanol and water and dried.

About 2.20 grams of pulp gave 2.47 grams of polymer-modified product. The pulp was white and microscopic examination showed no appreciable polymer coating. The polymer-modified pulp sheet could be fibrillated by beating in a water suspension in a Waring Blendor. The pulp sheets were not soluble in cellulose solvents and showed some flame retardency. They were resistant to acid attack. They had a tendency to brown when heated several hours at 130° C.

Example 12

The method of Example 11 was followed in this example, except that 10.0 grams of vinylidine chloride was used as the monomer and the heating at 50° C. was extended to 15 hours.

The 2.44 grams of pulp gave 5.61 grams of polymer-modified product. The pulp sheets had swollen during polymer deposition and were white. They were resistant to flame, insoluble in cellulose solvents and more resistant to microbiological attack in soil burial than was a quantity of untreated control pulp.

Example 13

In this example, an aqueous slurry of 0.5 grams or 100 parts of aspen sulfite pulp was diluted to 0.125% consistency by weight of oven dry pulp fibers, and was treated according to the method of this invention.

The wood fibers were first steeped in ferrous ammonium sulfate by adding to the slurry 140 parts of this compound expressed in terms of oven-dry pulp, and stirring the slurry gently for one hour. The steeping was performed at 25° C. and at pH 5.3. The ferrous ion not combined with the ion exchange groupings of the wood pulp fibers was washed out by two 20-minute washes with 200 parts of distilled water.

After being treated with the ferrous solution, the wet wood pulp was brought back to 0.125% consistency by addition of distilled water, and 920 parts (in terms of oven dry pulp fibers) of ethyl acrylate was added with shaking. Sufficient hydrogen peroxide was added to the solution to bring it to 0.12% by weight of oven dry pulp fibers. The pulp was left in the monomer solution for 20 minutes with continuous agitation at reflux.

The pulp fibers were removed and dried and found to have a weight increase of 150%. Analysis showed that 13% of the ethyl acrylate originally added to the solution had been converted to poly ethyl acrylate.

Examples 14–21

The method of Example 13 was followed in these examples for the treatment of softwood sulfate pulp, but with various quantities of ethyl acrylate and various reaction times employed as specified in Table I below.

In each case water was added to 4 grams or 100 parts of pulp to prepare a slurry having a consistency of 1.33% by weight of oven dry pulp fibers. The quantities of ferrous ammonium sulfate, ethyl acrylate, and hydrogen peroxide were 70, 115 and 2.25 parts, respectively, expressed as parts per 100 parts of oven dry pulp.

The resulting poly ethyl acrylate-modified wood pulp was dried and weighed. The following results were observed:

TABLE I

| Reaction time, minutes | Percent weight increase of pulp | Percent of monomer converted to polymer |
|---|---|---|
| 5 | 24 | 21 |
| 10 | 65 | 57 |
| 15 | 77 | 67 |
| 30 | 82 | 71 |
| 5 | 45 | 39 |
| 5 | 25 | 22 |
| 5 | 48 | 42 |
| 5 | 57 | 50 |

Examples 22–24

The method of Example 13 was followed in these examples for the treatment of softwood sulfate pulp by deposition of poly butyl acrylate, with various reaction times for the deposition step, giving the results set forth in Table II below.

In each case 4 grams or 100 parts of pulp were slurried with water to produce a slurry having a consistency of 1.33% by weight of oven dry pulp fibers. The quantities of ferrous ammonium sulfate, butyl acrylate, and hydrogen peroxide employed were 70, 111 and 2.25 parts, respectively, expressed as parts per 100 parts of oven dry pulp.

The resulting poly butyl acrylate-modified wood pulp was dried and weighed. The following results were observed:

TABLE II

| Reaction time, minutes | Percent weight increase of pulp | Percent of monomer conversion |
|---|---|---|
| 5 | 83 | 75 |
| 10 | 84 | 76 |
| 15 | 82 | 74 |

Example 25

The method of Example 13 was followed in this example for the treatment of softwood sulfate pulp by deposition of poly methyl methacrylate.

Six grams or 100 parts of pulp were slurried to produce a slurry having a consistency of 2% by weight of oven dry pulp fibers. The quantities of ferrous ammonium sulfate, methyl methacrylate, and hydrogen peroxide employed were 1, 100 and 2.25 parts, respectively, expressed as parts per 100 parts of oven dry pulp. With a reaction time of 10 minutes, the weight increase of pulp and monomer conversion were each found to be 92%.

Example 26

The method of Example 13 was followed in this example for the treatment of softwood sulfate pulp by deposition of polyvinyl acetate.

Four grams or 100 parts of pulp were slurried in water to make a slurry having a consistency of 1.33% by weight of oven dry pulp fibers. The quantities of ferrous ammonium sulfate, vinyl acetate, and hydrogen peroxide employed were 70, 115 and 2.25 parts, respectively, expressed as parts per 100 parts of oven dry pulp. With a reaction time of 30 minutes, the weight increase of pulp and monomer conversion were found to be 30% and 26%, respectively.

Example 27

The rate of moisture regain was measured on fluffed wood pulps containing interior deposited polymers at 25° C. and 70% relative humidity. The moisture regain was expressed on the basis of the cellulose content of the polymer-modified wood pulps. Moisture regain was started from the bone-dry pulp.

The control on these moisture regain experiments was done by using the same wood pulp that was used in the polymer deposition. This pulp was fluffed under the same conditions as those used in fluffing the polymer-modified pulps. The control pulp was dried bone dry and hygrostated along with the polymer-modified pulps in the same oven and in the same hygrostat.

TABLE III

| Type of pulp | Moisture regain (percentage of polymer-modified wood fibers) | |
|---|---|---|
| | 8 hours | 70 hours |
| 1. Unmodified chemical pulp | 6.5 | 7.1 |
| 2. Wood pulp with 48% polymethyl methacrylate | 2.9 | 3.6 |
| 3. Wood pulp with 10.5% polyvinylidene chloride | 4.1 | 5.5 |
| 4. Wood pulp with 35% polyvinylidene chloride | 2.8 | 3.7 |
| 5. Wood pulp with 4.6% polystyrene | 4.6 | 5.7 |

Example 28

In this example, a guanidine hydrochloride-ammonium persulfate catalyst system was used for deposition of methyl acrylate into wood fibers. The deposition was performed under nitrogen at 25° C. for 18 hours. A sample of pulp was steeped in 1% solution of guanidine hydrochloride for 20 minutes at 25° C. and then washed three times for ten minutes each time in distilled water 200 times its weight. In each wash the pulp was filtered to remove the cation of guanidine hydrochloride not bound by cation exchange to the wood pulp. The treated pulp was then dropped into 300 ml. of deaerated distilled water and 20 ml. of methyl acrylate. Enough ammonium persulfate was added so that its concentration in solution was 0.1%.

Only small amounts of polymer formed in the aqueous solution, but 3.217 grams of pulp had increased in weight after drying to 4.103 grams.

Example 29

In this example, an ethanolamine-ammonium persulfate catalyst system was employed. Using the method of Example 28, a portion of pulp was steeped in 1% ethanolamine solution, washed, added to the monomer and persulfate, washed and dried.

The initial 1.38 grams of pulp increased to 2.45 grams of polymer-modified pulp. It was noted that a small amount of bulk polymerized polymer formed on the bottom of the flask.

Example 30

In this example, polymethylacrylate was deposited into chemical wood pulp at the reflux temperature of a 5% monomer solution in distilled water without the use of a nitrogen blanket. A sample of wood pulp was steeped for ion exchange bonding of ferrous iron in 1% aqueous ferrous chloride solution for 30 minutes and washed with distilled water to remove uncombined ferrous iron.

The treated pulp was placed in 5% monomer solution and enough hydrogen peroxide was added so that its concentration in solution was 0.03%. The pulp was left in the refluxing solution for 30 minutes.

After washing and drying, the pulp sample contained 34% polymer. The pulp was a slight tan color and was not noticeably tacky.

In a small press at 120° C. and a pressure of 2000 pounds per square inch the poly methyl acrylate-modified wood pulp could be molded into strong, translucent sheets.

Example 31

In this example, the method of Example 30 was repeated except that the pulp was left in the refluxing solution for one hour.

The resulting wood pulp product appeared substantially the same as the product of the preceding example, but contained 51% polymer. This polymer-modified product could be molded into strong, translucent sheets as could the product of the preceding example, with even greater translucence than the preceding product.

Example 32

In Examples 30 and 31 very little polymer formed in the aqueous solution. If, however, one wishes to secure polymerization in the aqueous solution as well as interior deposited polymer, the pH of the aqueous monomer solution may be lowered during the polymer deposition and ferrous iron or other ion thus partially displaced from the wood fiber so that with the hydrogen peroxide it can initiate aqueous phase polymerization.

1.74 grams of wood pulp was ion-exchanged in ferrous solution, washed, and dropped into the 5% methyl acrylate solution as before. After polymer deposition took place for 10 minutes, 5 ml. of 0.1 N sulfuric acid was added to the 500 ml. of monomer solution and reflux of the suspended wood pulp was continued ten additional minutes.

The initially tan suspension became almost white. When the pulp was decanted onto ice it made a gummy mass that weighed 5.07 grams when dried at 80° C. under vacuum. This mass could be easily molded into wood fiber-reinforced sheets. The sheets were slightly tacky.

Example 33

When the method of Example 32 was repeated except that 1.0 ml. of .1 N acid was added in place of the sulphuric acid, 1.5 grams of pulp increased in weight to 3.1 grams and the pulp mass was much less tacky. It could be pressed to a translucent sheet under heat and pressure.

This pH gradient deposition will secure some interior deposited polymer and some polymer coating of wood fibers that is a graduation in amount of polymer from the interior of the fiber to the outside.

Example 34

This example illustrates the use of a single component catalyst system to initiate polymerization in the method of this invention.

A pre-hydrolyzed sulfate viscose dissolving pulp of known bone-dry weight is removed from a hydgrostat. The pulp contains a cation-exchange capacity of 0.02 meq./gm. The pulp is steeped in 0.5% aqueous solution of uranyl nitrate at pH 5.0 with stirring for 20 minutes in the dark.

The pulp thus subjected to cation exchange is washed twice in 1:100 liquor ratio of distilled water for only five minutes each wash to avoid loss of bound uranyl ion by hydrolysis from the ion binding groups of the cellulose.

The pulp thus treated is placed in a 40% solution of acrylamide in water for 20 minutes. The monomer-impregnated pulp is then spread in a layer 1/32" thick in sunlight at 25,000 foot-candles and room temperatures for ten minutes.

When the wood pulp is washed in warm distilled water overnight and dried it is found to have increased in weight by 10 percent. The pulp pieces are stiffer than before the treatment.

When the polymer-modified pulp is placed in hydrazine hydrate for 50 hours, washed in distilled water for several hours and placed in neutral 0.02 N potassium permanganate, the wood fiber becomes brown-black and much darker than a control, unmodified wood fiber stained in the same way. The stain extends through the wood fiber substrate.

The polymer-modified wood fibers are swollen in cupr-ammonium hydroxide but do not dissolve appreciably.

Example 35

This example and the next example show the deposition of polymers into solid balso wood.

Thin sheets of balso wood of about one mm. thickness were steeped for one hour in 0.1% ferrous iron solution. They were washed free of uncombined iron and dropped into a 400 ml. solution of 0.03% hydrogen peroxide containing 10 ml. of methyl-methacrylate and allowed to remain at room temperature for twelve hours. In the morning the sheets were washed for several hours and then dried for twelve hours at 80° C. under vacuum. They were found to have increased in weight by an average of 86%. The sheets were covered with a smooth, seemingly nonporous layer of the polymethylmethacrylate. Cross section showed that the entire thickness of the wood had been impregnated with the polymer.

Example 36

The procedure of Example 35 was repeated, except that the pentachlorophenol ester of acrylic acid was used. Vigorous stirring was also employed to keep the ester suspended. After drying, the wood had increased in weight by 3.4%. It was a slightly yellowish color, probably due to the oxidized iron. This, as well as Example 35, was performed on a known weight of water extracted wood to avoid the error in the determination of the increase in weight due to water soluble constituents of the wood.

Example 37

This example shows the deposition of allyl-acrylate polymers into wood fibers.

Pre-hydrolyzed sulfate dissolving pulp is steeped in 1% ferrous chloride solution at 25° C. for one hour at a liquor ratio of 1:200, and the cation exchanged pulp is filtered and washed with distilled water until the pulp is substantially free of uncombined iron. The pulp is then slurried in distilled water. To the one gram of pulp in 200 ml. of water is added two grams of allyl acrylate monomer and the slurry is mixed to saturate the water. The temperature is raised to reflux, and after purging the flask contents with nitrogen, enough hydrogen peroxide is added so that its concentration in the solution is 0.03% and reflux is continued for 45 minutes. When the pulp is washed and dried it is found to have increased in weight by about 5%. It is discovered that only about 20% of the initial unsaturation in the allyl part of the deposited polymer is present. The polymer-modified wood pulp has almost the same hydrophilicity as before.

The polymer-modified fibers are swelled and slowly dissolved in the Jayme iron-tartrate cellulose solvent. It is difficult to convert more than a trace of the deposited polymer to the acid hydrazide by refluxing the wood fibers with a 1:100 weight ratio of hydrazine hydrate.

Example 38

This example shows the deposition of vinyl methacrylate polymers into wood pulp.

Bleached sulfate pulp having an ion exchange capacity of 0.02 meq./gm. is steeped in 1% aqueous ferrous chloride solution at pH 5.0 and a liquor ratio of 1:200 for 30 minutes at 25° C. The pulp is present as a slurry and is stirred during ion exchange. The pulp with ferrous iron bound thereto is washed twice after filtration in the same volume of distilled water. The one gram of pulp is placed in a mixture of 200 ml. of water and 2 grams of vinyl methacrylate monomer at reflux, enough hydrogen peroxide is added to make its concentration in the solution 0.006%, and the solution is boiled at reflux for one hour.

When the pulp is filtered, washed, and dried under vacuum, it is found to have increased in weight by about 15% and to have about 30% unsaturation in the interior deposited polymer.

The unsaturation in the interior deposited polymer is shown by bromination determinations after the polymer-modified fibers have been swollen in acid.

The fact that the polymer is mixed with the actual wood substance and not merely a coating on the fibers is shown by reacting the fibers with 0.02 Normal potassium permanganate solution for 20 minutes and then examining microscopically the wood fiber cross section. The entire wood fiber substance is stained dark brown.

It is noted that the polymer-modified wood fibers are more hydrophobic than normal.

Example 39

This example shows the deposition of 4-vinyl-cyclohexene into wood fibers.

One gram (dry basis) of sulfate wood pulp is slurried in water to make a 0.5% suspension and combined with ferrous iron by ion exchange at pH 5 from a 1% ferrous chloride solution. Then the treated pulp is washed to remove uncombined iron and added to a 1% suspension of the monomer at a 1:500 liquor ratio. When the solution is adjusted to 0.03% concentration of hydrogen peroxide and refluxed for 10 minutes, the pulp after washing increases in weight by about 2%.

Other samples of pulp when subjected to the above conditions for thirty minutes or more begin to be degraded.

The poly-4-vinylcyclohexene-modified pulp when stained with iodine or neutral, dilute potassium permanganate is stained more than the control fibers.

The above detailed description has been given for clearness of understanding only. No unnecessary limitations should be understood therefrom, as modifications will be obvious to those skilled in the art.

What is claimed is:

1. A composite polymeric material comprising woody cellulosic fibers having a guest polymer derived from an olefinically unsaturated monomer deposited and graft polymerized in situ predominantly within the interior of individual ones of said fibers and not substantially on the surface thereof.

2. The composite polymeric material according to claim 1 in which the guest polymer is a polyvinyl resin.

3. The composite polymeric material according to claim 2 in which the guest polymer is polystyrene.

4. The composite polymeric material according to claim 2 in which the guest polymer is a polyacrylic resin.

5. The composite polymeric material according to claim 4 in which the guest polymer is a polyacrylic ester.

6. The composite polymeric material in accordance with claim 1 in which the guest polymer is polymethylmethacrylate, polymethylacrylate, polyethylacrylate, polybutylacrylate, polyvinylacetate, poylvinylidenechloride, polystyrene, polyacrylonitrile, poly 4-vinylpyridine, polyacrylamide, poly 4-vinylcyclohexene, polyvinylmethacrylate, or polyallylacrylate.

7. The composite polymeric material in accordance with claim 1 comprising a molded article prepared from said graft polymerized fibers.

8. The composite polymeric material in accordance with claim 1 comprising paper formed at least in part from said graft polymerized woody fibers.

9. The composite polymer material in accordance with claim 1 comprising paper board formed at least in part of said graft polymerized woody fibers.

References Cited

UNITED STATES PATENTS

| | | | |
|---|---|---|---|
| 2,147,824 | 2/1939 | Webb | 156—155 |
| 3,081,143 | 3/1963 | Segro et al. | 8—116 |
| 3,083,118 | 3/1963 | Bridgeford | 117—47 |

ROBERT F. BURNETT, Primary Examiner

R. L. MAY, Assistant Examiner

U.S. Cl. X.R.

8—116; 117—143, 148; 161—170; 162—157, 168